UNITED STATES PATENT OFFICE

LORENZO SIBERT, OF STAUNTON, VIRGINIA.

IMPROVEMENT IN FLUXES FOR THE MANUFACTURE OF IRON AND STEEL.

Specification forming part of Letters Patent No. 117,693, dated August 1, 1871.

*To all whom it may concern:*

Be it known that I, LORENZO SIBERT, of Staunton, in Augusta county and State of Virginia, have invented or discovered a new and useful Improvement in Fluxes for the treatment of iron ores or the molten metal obtained therefrom, of which the following is a full, clear, and exact description.

This invention is an improvement upon the flux patented to me in Letters Patent No. 79,152, dated June 23, 1868; and consists of hydrated peroxide of iron, perchloride of iron, or ammonio-chloride of iron, with or without the flux specified in my patent above mentioned.

I use iron-trimmings, filings, or iron in any comminuted form, in a saturated solution of sal-ammoniac (chloride of ammonium) in either hot or cold water. After a full reaction, the resulting matter is mixed in a dry powder with the flux specified in my previous patent, above mentioned, in such proportions as different grades of iron may require. For gray iron I find ten pounds of this product to two thousand pounds of molten metal to work well, and for other grades between that and floss or white metal, a smaller quantity, in proportion to the character or quality of the metal. In converting the iron into steel an experienced eye will be governed by the flame and color of the molten mass, by which the proper quantity of flux required will be indicated. By the use of this flux the mass is rendered more fluid at the same temperature; it also protects the metal from burning, increases its homogeneity, ductility, and flexibility, and may be used with advantage in a reducing, puddling, balling, or refining-furnace. If the solution of sal-ammoniac is made with hot water it should be used while hot, and in smaller quantity, as in that condition it will contain more of the chloride of ammonium, a portion of which will be precipitated in cooling. The flux is applied as soon as the metal is at or nearly at a fluid state, which is thereby rendered more fluid and at the same time purified. It may be used with advantage during any stage of the reducing or refining processes, but I prefer to use it in the refining-fires or crucibles.

Having thus described my invention, what I claim as new, and desire to secure by Letters Patent, is—

1. The combination of ammonio-chloride of iron or its equivalent, with the flux heretofore patented by me, as above specified, in the manner and for the purpose set forth.

2. A flux consisting of ammonio-chloride of iron, hydrated peroxide of iron, or perchloride of iron, with or without other flux, and applied during any stage of reduction of the ore or refining of the metal.

LORENZO SIBERT.

Witnesses:
L. R. SMOOT,
D. H. EVANS.